United States Patent
Wei et al.

(10) Patent No.: US 10,498,517 B2
(45) Date of Patent: Dec. 3, 2019

(54) WIRELESS COMMUNICATION DEVICE AND WIRELESS COMMUNICATION METHOD

(71) Applicant: Sony Corporation, Tokyo (JP)

(72) Inventors: Zaixue Wei, Beijing (CN); Xin Zhang, Beijing (CN); Nanxi Li, Beijing (CN); Dan Zhang, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 39 days.

(21) Appl. No.: 14/988,789

(22) Filed: Jan. 6, 2016

(65) Prior Publication Data

US 2016/0262147 A1    Sep. 8, 2016

(30) Foreign Application Priority Data

Mar. 3, 2015   (CN) .......................... 2015 1 0094726

(51) Int. Cl.
*H04W 72/04*   (2009.01)
*H04L 5/00*    (2006.01)
*H04B 7/06*    (2006.01)

(52) U.S. Cl.
CPC ............. *H04L 5/0057* (2013.01); *H04B 7/06* (2013.01); *H04L 5/0092* (2013.01)

(58) Field of Classification Search
CPC ................................................ H04W 72/0413
See application file for complete search history.

(56) References Cited

U.S. PATENT DOCUMENTS

| | | | | |
|---|---|---|---|---|
| 2007/0255927 A1* | 11/2007 | Vasekin | .................. | G06F 9/342 711/213 |
| 2009/0163142 A1* | 6/2009 | Pi | .......................... | H04L 1/0026 455/62 |
| 2017/0231000 A1* | 8/2017 | Nagata | ................ | H04W 74/008 |

* cited by examiner

*Primary Examiner* — John D Blanton
(74) *Attorney, Agent, or Firm* — Xsensus LLP

(57) ABSTRACT

The disclosure involves wireless communication device and method. The device includes a communication unit configured to perform a first feedback operation corresponding to a first feedback configuration and to perform a second feedback operation based on a second feedback configuration. The first and second feedback configurations each include a selection for sub-table of a CQI table, and the second feedback configuration is determined based on result of the first feedback operation.

5 Claims, 12 Drawing Sheets

| CQI index | modulation order | code rate x 1024 | efficiency |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2237 |
| 14 | 256QAM | 885 | 6.9153 |
| 15 | 256QAM | 948 | 7.4063 |

| CQI index | modulation order | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 256QAM | 711 | 5.5547 |
| 16 | 256QAM | 797 | 6.2237 |
| 17 | 256QAM | 885 | 6.9153 |
| 18 | 256QAM | 948 | 7.4063 |

Fig. 15

WIRELESS COMMUNICATION DEVICE AND WIRELESS COMMUNICATION METHOD

FIELD

The present disclosure generally relates to the field of wireless communication, and in particular to a wireless communication device and a wireless communication method for performing a feedback operation with respect to channel quality.

BACKGROUND

In a small cell enhancement scheme involved in for example the 3$^{rd}$ Generation Partnership Project (3GPP), an important aim is to use a high-order modulation scheme (for example, 256 Quadrature Amplitude Modulation (QAM)) in downlink transmission to improve spectrum efficiency. In order to support the 256 QAM downlink transmission in a conventional system, it is necessary to redesign a Channel Quality Indicator (CQI) table, for example, by deleting several Quadrature Phase Shift Keying (QPSK) indices, adding several new 256 QAM indices, and keeping the size of the CQI table unchanged.

With this modification, the range of modulation order of the CQI table is extended, while the size of the table is unchanged, which would result in degraded accuracy of the CQI table. It is conceivable that, with development of communication technology and physical devices, higher modulation order will be implemented and introduced into existing systems. If the method in the 3GPP is still adopted to modify the CQI table by deleting some original indices and adding some new indices, the accuracy of the CQI table will becoming lower and lower, which may lead to a degradation of system performance.

SUMMARY

A brief summary of embodiments of the invention will be given hereinafter, so as to provide basic understanding of some aspects of the invention. It is to be understood that, the following summary is not an exhaustive summary. It is neither intended to determine a key or important part of the invention, and nor intended to define the scope of the invention. Its object is solely to give some concepts in a simplified form, for serving as a preamble portion of detailed description discussed later.

In an aspect of the invention, a wireless communication device is provided, which includes a communication unit. The communication unit is configured to perform a first feedback operation corresponding to a first feedback configuration and to perform a second feedback operation based on a second feedback configuration. The first feedback configuration and the second feedback configuration each include a selection for a sub-table of a channel quality indication table, and the second feedback configuration is determined based on a result of the first feedback operation.

In another aspect of the invention, it is provided a wireless communication method, which includes: performing a first feedback operation corresponding to a first feedback configuration; determining a second feedback configuration based on a result of the first feedback operation; and performing a second feedback operation based on the second feedback configuration. The first feedback configuration and the second feedback configuration each include a selection for a sub-table of a channel quality indication table.

The wireless communication device according to the embodiment of the invention may operate as a user equipment or a base station.

With the solutions according to the embodiment of the invention, channel quality feedback supporting a high-order modulation scheme is achieved without reducing the accuracy of CQI table.

BRIEF DESCRIPTION OF THE DRAWINGS

The invention will be better understood with reference to the description given in conjunction with the drawings hereinafter. Throughout the drawings, same or similar components are denoted by same or similar reference numbers. The drawings together with the following detailed description is included in the specification and forms a part of the specification, and is used to exemplify preferred embodiments of the invention and explain the principle and advantages of the invention.

FIG. 15 shows an example of a CQI table obtained by extending the CQI table of FIG. 14.

DETAILED DESCRIPTION OF EMBODIMENTS

Hereinafter, embodiments of the invention will be described with reference to the drawings. Elements and features described in a drawing or an embodiment of the invention can be combined with elements and features described in one or more other drawings or embodiments. It is to be noted that, illustration and description of components and processes not related to the invention and known by those ordinary skilled in the art are omitted from the drawings and descriptions for clarity.

Figures 1, 2:
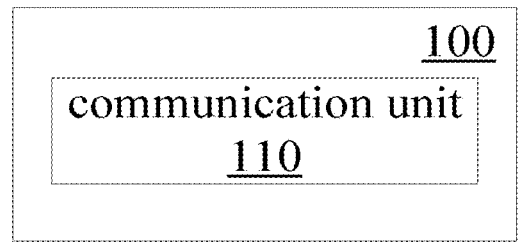
FIG. 1 is a block diagram illustrating a configuration example of a wireless communication device according to an embodiment of the invention.
FIG. 2 is an example of a channel quality indication table and its sub-table as an example of a feedback configuration.

As shown in FIG. 1, a wireless communication device 100 according to an embodiment of the invention includes a communication unit 110. The communication unit 110 is configured to perform a first feedback operation corresponding to a first feedback configuration and to perform a second feedback operation based on a second feedback configuration. The first feedback configuration and the second feedback configuration each include a selection for a sub-table of a CQI table, and the second feedback configuration is determined based on a result of the first feedback operation.

Herein, "feedback operation" refers to an operation relating to feedback of channel quality, and "feedback configuration" refers to a configuration adopted in a feedback operation of channel quality. Specifically, the feedback configuration includes, for example, a selection for a sub-table of a CQI table.

Further, as described in conjunction with specific embodiments in the following, "a first feedback operation corresponding to a first feedback configuration" may include performing feedback of channel quality (including an operation relating to a feedback of channel quality which is performed on a base station side and an operation relating to a feedback of channel quality which is performed on a user equipment side) by using the first feedback configuration, and may also include an operation relating to the first feedback configuration which is performed to prepare for a feedback of channel quality, for example, communication between the base station and the user equipment regarding the first feedback configuration (for example, including notifying, by the base station, the first feedback configuration to the user equipment and receiving, by the user equipment, the notification about the feedback configuration from the base station, and the like). In other words, "a first feedback operation corresponding to a first feedback configuration" does not necessarily include an actual feedback of channel quality, but may also include preparation works for a feedback of channel quality, such as information interaction or the like.

In the communication device and method according to embodiments of the invention, the feedback of channel quality is performed by using a sub-table of the CQI table. The whole CQI table may include more entries as compared with a conventional CQI table. For example, new entries may be added into the CQI table in an ascending order of modulation order or an ascending order of code rate. The whole CQI table may be predetermined before the communication process and is known to the base station and the user equipment. The sub-table of the CQI table may include for example multiple sub-tables (each of which is equivalent to a window of the CQI table). The setting of the sub-table may be predetermined before the communication process and is known to the base station and the user equipment. Thus, in the communication process, the base station and the user equipment may determine the sub-table to be used based on only an index of the sub-table.

According to a specific embodiment, the number of sub-tables, the length of sub-tables and/or the overlapping degree between adjacent sub-tables may be predetermined.

Figures 13, 14:
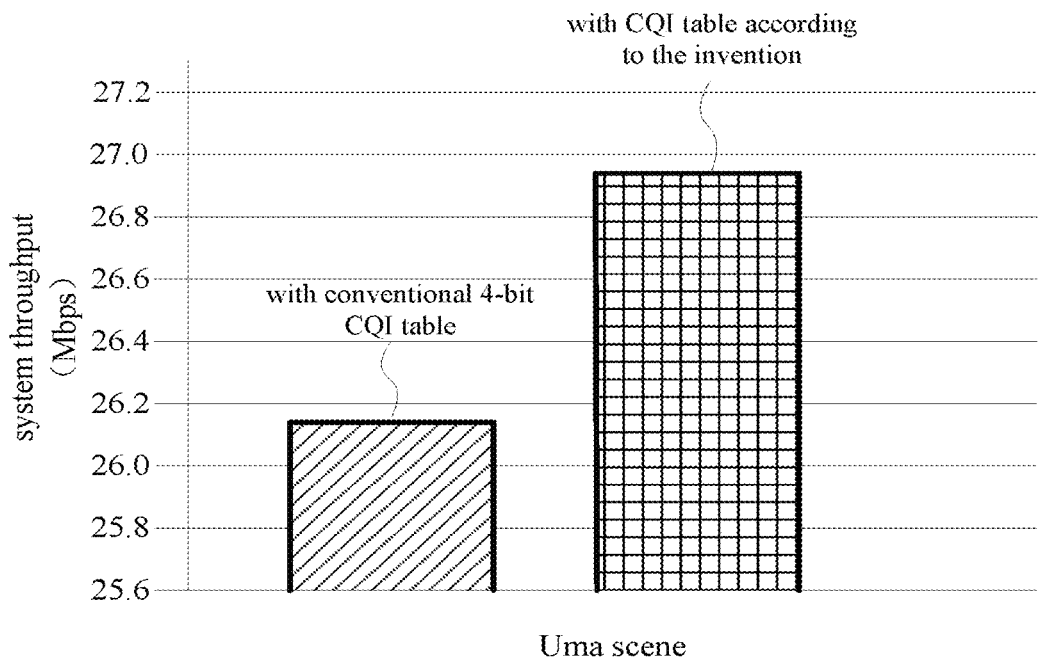
FIG. 13 shows simulation results of system throughput with a solution of the invention and with a conventional 4-bit CQI table in an Urban Macro cell (UMa) scene.
FIG. 14 shows an example of a CQI table with a length of 16 entries.

For example, as shown in FIG. 2, the CQI table 200 includes multiple entries, which respectively corresponding to CQI index 0, 1, . . . . Further, several sub-tables may be predefined, each of which may have its own sub-table index, such as sub-table #0, sub-table #1, . . . (only two sub-tables are shown). In this example, the length of each of the sub-tables is 16, i.e., each of the sub-tables contains 16 ones of the entries of the CQI table. The length of the CQI table is the same as that of the conventional CQI table. However, the sub-tables may have a different length. Further, there may be a determined degree of overlapping between adjacent sub-tables (i.e., sub-tables with adjacent index values). In other words, adjacent sub-tables may contain predetermined number of common entries. In the example of FIG. 2, the sub-table #0 contains entries corresponding to CQI indices 1 to 16 in the CQI table, and the sub-table #1 contains entries corresponding to CQI indices 3 to 18 in the CQI table. That is, the overlapping degree between adjacent sub-tables is 14 entries. In other examples, the number of the sub-tables, the length of the sub-table and the overlapping degree between adjacent sub-tables may be set as required. In an embodiment of the invention, the sub-table index is variable and the sub-table overlapping degree is adjustable, thereby leading to higher flexibility, so that the user equipment can feed back CQI within the range of a window with higher probability, and overhead for window switching in a case where CQIs of the user equipment fall among un-overlapped windows. FIGS. 14 and 15 show examples of the CQI table. The length of the CQI table of FIG. 14 is 16 entries, which is the same as that of the CQI table used in conventional art, indicating that entries for 256 QAM are contained therein and accordingly the number of entries for relatively lower order modulation scheme is reduced. The CQI table of FIG. 15 includes further three entries as compared with the CQI table of FIG. 14 (entries 2, 4 and 6 in the table in FIG. 15). In a solution according to an embodiment of the invention, the extended CQI table shown in FIG. 15 may operates as for example the whole CQI table mentioned previously, for performing feedback of channel quality by using the sub-table selected from this whole table.

During communication process, base station and user equipment indicate via information interaction the initial sub-table (a first feedback configuration) to be used. In a case where the initial sub-table does not meet the requirement of the feedback operation of channel quality, the selection for the sub-table can be adjusted, and the feedback operation of channel quality is performed by using the adjusted sub-table (a second feedback configuration).

In an embodiment, an initial sub-table is indicated by a sub-table index value, and the adjusted sub-table is indicated by an offset with respect to the index value of the initial sub-table. For example, the adjustment to the sub-table index may be indicated by one bit of information, for example, with "0" indicating that the sub-table index is decreased by 1 and "1" indicating that the sub-table index is increased by 1. By indicating the adjustment to the sub-table by using the offset of the sub-table index value, the communication load can be decreased.

It is to be noted that, the wireless communication device according to an embodiment of the invention may operate as a communication device on base station side or a communication device on user equipment side. Further, the determination of the initial sub-table (the first feedback configuration) and the determination of the adjustment to the sub-table (the second feedback configuration) each may be performed by the base station, by the user equipment, or respectively by the base station and the user equipment. Next, the exemplary embodiment of the invention will be described for following four schemes respectively.

Scheme 1, the selection for the initial sub-table and the adjustment to the sub-table are performed by base station.

Scheme 2, the selection for the initial sub-table is performed by base station and the adjustment to the sub-table is performed by user equipment.

Scheme 3, the selection for the initial sub-table is performed by user equipment and the adjustment to the sub-table is performed by base station.

Scheme 4, the selection for the initial sub-table and the adjustment to the sub-table are performed by base station.

In a case where the wireless communication device according to the embodiment of the invention is a user equipment: for the above scheme 2, the first feedback operation can be receiving information indicative of the first feedback configuration from a base station; for the above schemes 1, 3 and 4, the first feedback operation can be feeding back channel quality to the base station based on the first feedback configuration; for the above schemes 1-4, the second feedback operation can be feeding back channel quality to the base station based on the second feedback configuration.

In a case where the wireless communication device according to the embodiment of the invention is a base station: for the above scheme 2, the first feedback operation can be sending information indicative of the first feedback configuration to a user equipment; for the above schemes 1, 3 and 4, the first feedback operation can be receiving channel quality fed back by the user equipment based on the first feedback configuration; for the above schemes 1-4, the second feedback operation can be receiving channel quality fed back by the user equipment based on the second feedback configuration.

In a case where the wireless communication device according to the embodiment of the invention is a user equipment, for the above schemes 3 and 4, the initial sub-table is determined by the user equipment. Next, a configuration example of the user equipment in this case will be described with reference to FIG. 3 again.

Figure 3:
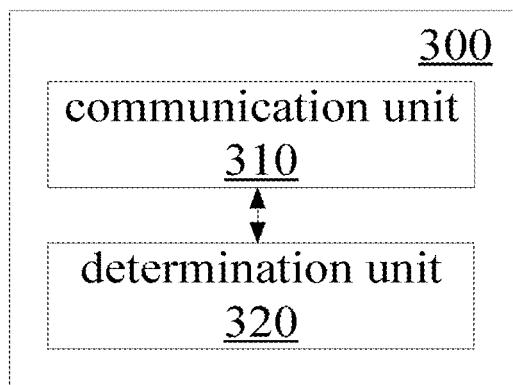
FIG. 3 is a block diagram illustrating a configuration example of a user equipment according to an embodiment of the invention.

As shown in FIG. 3, user equipment 300 includes communication unit 310 and determination unit 320. The communication unit 310 is configured to feed back channel quality to a base station based on the first feedback configuration (i.e., the initial sub-table), and to feed back channel quality to the base station based on the second feedback configuration (i.e., the adjusted sub-table). The determination unit 320 is configured to determine the first feedback configuration (i.e., the initial sub-table). For example, the determination unit 320 may select the initial sub-table based on signal quality of a request signal (for example a CQI request) received from the base station. For example, the determination unit 320 may select the initial sub-table so that the CQI index corresponding to the signal quality of the request signal is located in a middle position of the initial sub-table. Further, the communication unit 310 may notify the base station of the initial sub-table determined by the determination unit 320.

In a case where the wireless communication device according to the embodiment of the invention is a user equipment, for the above schemes 2 and 4, the adjustment to the initial sub-table is determined by the user equipment. Next, a configuration example of the user equipment in this case will be described with reference to FIG. 3.

As shown in FIG. 3, user equipment 300 includes communication unit 310 and determination unit 320. The communication unit 310 is configured to feed back channel quality to a base station based on the initial sub-table, and to feed back channel quality to the base station based on the adjusted sub-table. The determination unit 320 is configured to determine the second feedback configuration (i.e., the adjustment to the sub-table). For example, in a case where the channel quality to be fed back contains a channel quality indication adjacent to a boundary of a current sub-table, the determination unit 320 may determine the adjustment to the sub-table by adjusting the selection for the sub-stable corresponding to the direction of the boundary. Further, the communication unit 310 may notify the base station of the initial sub-table determined by the determination unit 320.

Particularly, for the above scheme 4, the determination unit 320 of the user equipment 300 may be configured to determine both the first feedback configuration and the second feedback configuration.

Further, in a case where a channel quality indication index of a frequency band containing multiple sub-bands is to be fed back, the determination unit 320 may determine the adjustment to the sub-table according to the criterion of: selecting a sub-table containing an overall channel quality indication index of the frequency band and a predetermined number of maximum indices among channel quality indication indices of the sub-bands; or selecting a sub-table whose center index has a small difference from the overall channel quality indication index of the frequency band when there is a sub-table containing the channel quality indication indices of all the sub-bands.

More specifically, assuming that a downlink frequency band allocated to the user equipment contains n sub-bands, the user equipment firstly calculates the CQI index of the overall channel, assuming that this index is $\tilde{c}$, the user equipment calculates the CQI index on each of these sub-bands, and the group consisted of these indices is denoted as:

$$\{C\}=\{c_1, c_2 \ldots c_n\}.$$

For convenience of description, assuming $c_1 \leq c_2 \leq \ldots \leq c_n$, and assuming that there are m sub-tables each of which containing all the indices in $\{C\}$, there are following three cases based on the value of m.

1) m=0. In this case, the user equipment selects the sub-table containing $\tilde{c}$ and M maximum indices among $\{C\}$ as the sub-table to be used as the adjustment object. For example, the value of M may be determined based on the specification in table 7.2.1-5 in 3GPP TS 36.213. If the number of the sub-tables from which the sub-table can be selected is greater than 1, the user equipment selects the sub-table whose center index has a small difference from $\tilde{c}$ as the suitable sub-table.

2) m=1. In this case, this sub-table may be directly determined as the suitable sub-table.

3) m>1. In this case, the user equipment selects, from the sub-tables meeting the condition, the sub-table whose center index has a small difference from $\tilde{c}$ as the suitable sub-table.

In a case where the wireless communication device according to the embodiment of the invention is a user equipment, for the above scheme 2, the first feedback operation performed by the communication unit 310 of the user equipment 300 includes receiving information indicative of the first feedback configuration (i.e., the initial sub-table) from a base station, and the determination unit 320 determines the second feedback configuration (i.e., the adjustment to the sub-table). The determination result of the determination unit 320 may indicates that the selection for the sub-table does not need to be adjusted. In this case, the communication unit 310 may be configured to feed back channel quality directly using the initial sub-table. Thus, in an embodiment, in addition to the above first and second feedback operations, the communication unit 310 of the user equipment 300 is configured to perform a third feedback operation and a fourth feedback operation. The third feedback operation is to feed back channel quality to the base station based on the first feedback configuration (i.e., the initial sub-table), and the fourth feedback operation is to notify the second feedback configuration (i.e., the adjustment to the sub-table) to the base station. It is to be noted that, the numbers for the operations herein are only used to distinguish between different operations, but not intended to limit the order of the operations.

Further, the communication unit 310 may be configured to indicate, in uplink control information, whether the operation performed by the communication unit 310 is the third feedback operation or the fourth feedback operation, so that the base station can distinguish corresponding communication contents. For example, the communication unit may indicate, by a flag bit in uplink control information format or energy setting of bits in uplink control information format, whether the operation performed by the communication unit is the third feedback operation or the fourth feedback operation.

More specifically, a new Uplink Control Information (UCI) format may be defined. The new UCI format may be based on the conventional format2/2a/2b format, and differs from the conventional format2/2a/2b format only in that one flag bit is added ahead of the 20 bit Channel State Information (CSI) value to realize the report on the sub-table index offset and the acknowledgement information described above. For example, if this bit is "0", then the transmission mode is the same as usual, and the reading of the base station is unchanged; and if this bit is "1", it is arranged that the positions corresponding to the subsequent 4 bit CQI values are contents relating to the CQI sub-table index. Meanwhile, it may further be arranged that if a bit next to this flag bit is "0", it indicates that the CQI sub-table index calculated by the UE is different from the initial sub-table index determined by the base station, and the subsequent three bits indicate, for example, the offset value of the sub-table index; and if a bit next to this flag bit is "1", it indicates that the CQI sub-table index determined by the user equipment is the same as the initial sub-table index determined by the base station, and the subsequent three bits can be, for example, "000".

Alternatively, a new UCI format as follow may be arranged for transmitting the sub-table index. The length of the CSI is 3 bits. If the first bit is "0", it indicates that the CQI sub-table index determined by the user equipment is different from the initial sub-table index, and the subsequent two bits can indicate for example the offset value of the sub-table index; and if the first bit is "1", it indicates that the CQI sub-table index determined by the user equipment is the same as the initial sub-table index determined by the base station, and the subsequent two bits can be arranged to be, for example, "00".

Alternatively, new transmission parameters may be adopted without changing the existing UCI format, so that the value of the energy can carry information. Considering that the original modulation mode is the constant-modulus modulation, it is determined that a new mode is adopted on detection of a non-constant-modulus signal. For example, in a case where it is detected that, among 4 bits corresponding to the CQI, the energy of the former two bits is lower (higher) than that of the latter two bits, it indicates that what is transmitted is the sub-table index value; and in a case where it is detected that, among 4 bits corresponding to the CQI, the energy of the former two bits is higher (lower) than that of the latter two bits, it indicates that what is transmitted is the CQI index value. In a case where what is indicated is the sub-table index value, for example, in a case where the first bit is "0", it indicates that the CQI sub-table index determined by the user equipment is different from the initial sub-table index, and what is indicated by the subsequent three bits is the offset value of the sub-table index; and in a case where the first bit is "1", it indicates that the CQI sub-table index determined by the user equipment is the same as the initial sub-table index, and the subsequent two bits can be arranged to be, for example, "00".

Among the three manners described above, the first manner is the most direct, the extension of the CQI table can be adapted flexibly and the range and accuracy of the CQI feedback is increased, although one flag bit is added. In the second manner, a new UCI format is added, and the length of the CSI feedback field of this format is shorter, thereby reducing the overhead. The third manner may be combined with many formats conveniently without increasing the bit overhead and only with the complexity of transmission and reception increases. Further, it is to be understood by those skilled in the art that, the indication method for distinguishing between different feedback operations is not limited to the exemplary methods described above.

In a case where the wireless communication device according to the embodiment of the invention is a base station, for the above schemes 1 and 2, the initial sub-table is determined by the base station. Next, a configuration example of the base station in this case will be described with reference to FIG. 4 again.

Figure 4:
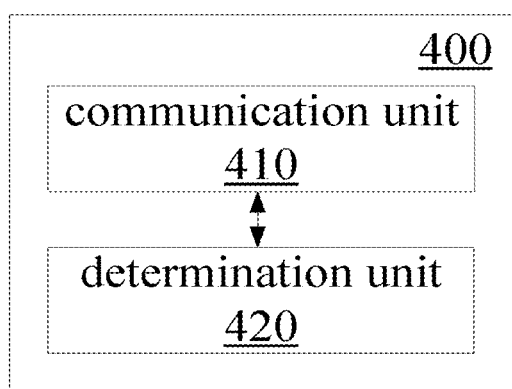
FIG. 4 is a block diagram illustrating a configuration example of a base station according to an embodiment of the invention.

As shown in FIG. 4, user equipment 400 according to the embodiment includes communication unit 410 and determination unit 420. The communication unit 410 is configured to send information indicative of the first feedback configuration (i.e., the initial sub-table) to the user equipment, or to receive channel quality fed back by the user equipment based on the first feedback configuration; and receive channel quality fed back by the user equipment based on the second feedback configuration (i.e., the adjusted sub-table). The determination unit 420 is configured to determine the initial sub-table.

Specifically, the determination unit 420 may determine the initial sub-table based on one selected from the group consisting of: signal coverage of the base station, communication load of the base station, statistical characteristic of mobility of user equipment served by the base station, and designed capacity of the base station, and any combination thereof. Based on these factors, the determination unit 420 may estimate a general condition of channel quality between the base station 400 and user equipments within the signal coverage of the base station 400, and select an initial sub-table based on the result of the estimation, so that, for example, the channel qualities fall within the initial sub-table as many as possible. Further, the communication unit 410 may notify the user equipment within the signal coverage of the base station 400 of the initial sub-table via a broadcast signal.

In a case where the wireless communication device according to the embodiment of the invention is a base station, in the above schemes 1 and 3, the second feedback configuration (the adjustment to the sub-table) is determined by the base station. Next, a configuration example of the base station in this case will be described with reference to FIG. 4 again.

The communication unit 410 of the base station 400 according to an embodiment of the invention is configured to receive channel quality fed back by the user equipment based on the first feedback configuration (i.e., the initial sub-table). The determination unit 420 is configured to determine a second feedback configuration based on the channel quality fed back by the user equipment.

More specifically, the communication unit 410 is configured to, in a case where the channel quality fed back based on the initial sub-table contains a channel quality indication adjacent to a boundary of the sub-table, determine the second feedback configuration by adjusting the selection for the sub-stable corresponding to the direction of the boundary.

Particularly, for the above scheme 1, the determination unit 420 of the base station 400 may be configured to determine both the first feedback configuration and the second feedback configuration.

Next, the exemplary processes corresponding to the schemes 1-4 described above will be described respectively with reference to FIGS. 6 to 9.

Figure 6:
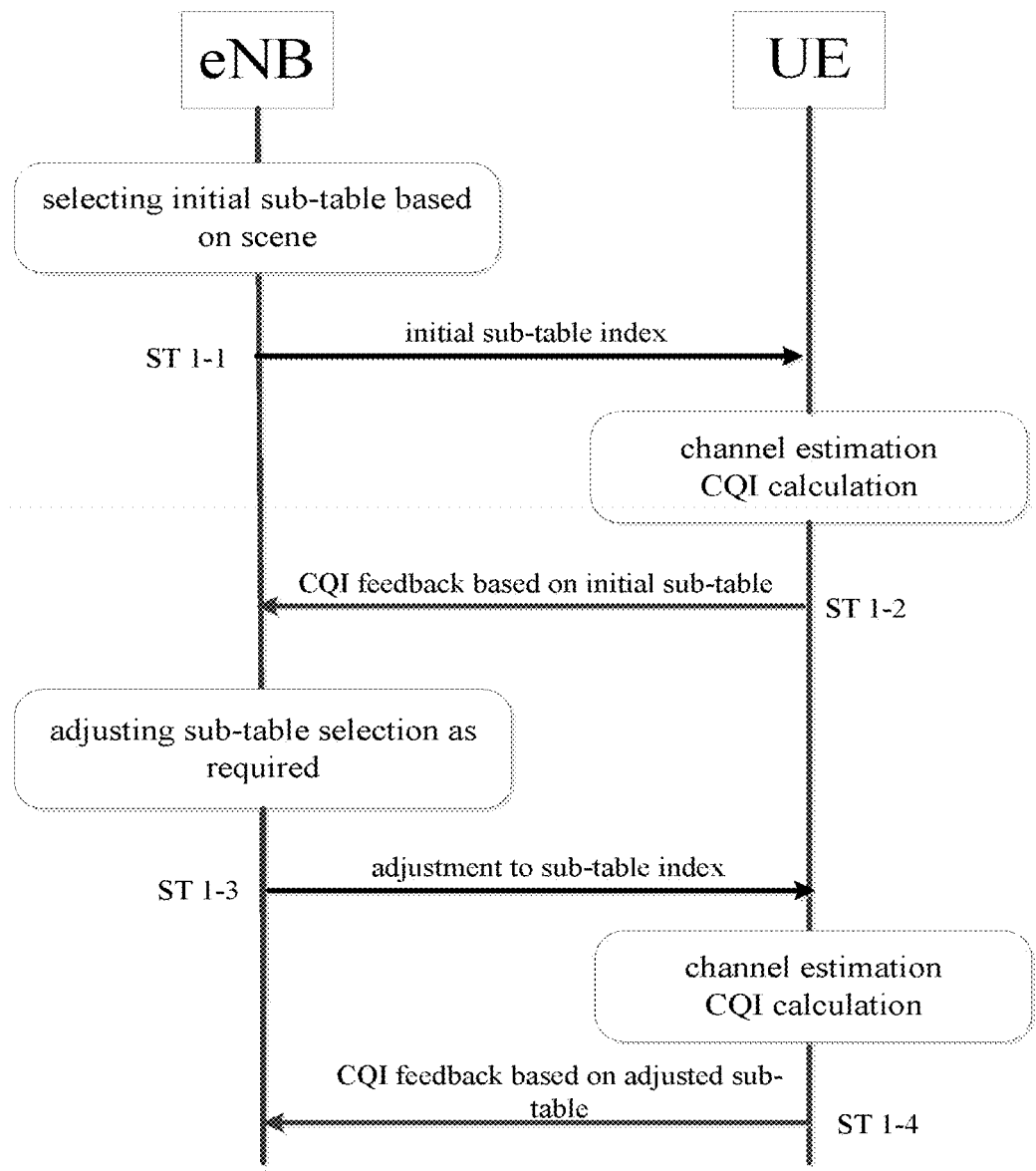
FIG. 6 is a schematic diagram illustrating an example process of a feedback operation performed between a user equipment and a base station according to an embodiment of the invention.

The exemplary process corresponding to the scheme 1 is as shown in FIG. 6, in which the initial sub-table is determined and the sub-table is adjusted by a base station (eNB).

The eNB selects an initial sub-table according to a specific scene, and sends the initial sub-table index to respective user equipments (UEs) for example over the downlink broadcast channel (ST1-1).

Upon reception of the index, the UE performs channel estimation and CQI calculation based on the signal from the eNB, and performs a feedback of intra-sub-table index by using the sub-table selected by the eNB (ST1-2).

The eNB analyzes the CQI information fed back by the UE. For example, in a case that the CQI is on the boundary of the sub-table, the eNB adjusts the sub-table, and notifies the UE of the adjustment to the sub-table (ST 1-3). The eNB may notify the UE of the result of the adjustment to the sub-table for example by using one bit of Downlink Control Information (DCI). Here, the boundary of the sub-table is defined as two ends of the index of the sub-table. For example, if the j-th sub-table contains entries in the CQI table with index ranging from i to (i+15), index i and index (i+15) are the boundaries of the sub-table (Alternatively, a predetermined number of indices at the two ends of the sub-table may also be defined as the boundary of the sub-table. For example, the indices i to (i+3) and the indices (i+13) to (i+15) are defined as the boundary of the sub-table). In a case where the CQI information fed back by the UE contains the index i, the eNB adjusts the sub-table index to be (j−1), and sends the corresponding DCI information to the UE; and in a case where the CQI information fed back by the UE contains the index (i+15), the eNB adjusts the sub-table index to be (j+1), and sends the corresponding DCI information to the UE. For example, the signaling of the DCI may be designed in manners as follows:

Manner 1-A: energy information is appended to a "flag for format 0/format 1A differentiation" bit of the DCI0 format. If it is detected at the receiving end that there is energy at this bit, then a "CQI request" bit indicates that the eNB has modified the sub-table index, with "0" indicating that the sub-table index is decreased by 1 and "1" indicating that the sub-table index is increased by 1.

Manner 1-B: a new DCI format is established. For example, the new DCI format is referred to as "DCI5", which is based on the DCI0 format, and is different from the DCI0 format only in that the last bit of the DCI0 format, i.e., "CQI request" bit, becomes "sub-table index adjustment" bit, with "0" indicating that the sub-table index is decreased by 1, and "1" indicating that the sub-table index is increased by 1. In this format, "flag for format 0/format 1A differentiation" in the DCI0 and DCI1A is modified to "flag for format 0/format 1A/format 5 differentiation", and the overhead is increased by 1 bit.

Manner 1-C: the DCI0 format is modified. One bit of "sub-table index adjustment" bit is added following the "CQI request" bit at the end of the DCI0 format, and energy information is appended to this bit. If no energy information is received on receiving end, the value of this bit is neglected and the sub-table index is not adjusted; if energy information is detected, then "0" indicates that the sub-table index is decreased by 1 and "1" indicates that the sub-table is increased by 1.

Next, the UE updates the sub-table index in response to the instruction from the eNB, and performs feedback of intra-sub-table index by using the updated sub-table (ST 1-4).

In this scheme, the sub-table index is determined by the eNB based on the scene. This scheme is particularly suitable to the scene in which the CQI distribution is relatively centralized, that is, all the UEs that are served by the eNB have relatively approximate channel qualities. In this case, the initial sub-table is distributed by the eNB uniformly. The initial sub-table would be more approximate to a suitable sub-table of the UEs, thereby significantly reducing the case in which the CQI fed back by a UE extends the coverage of the initial sub-table selection. Further, this scheme does not need feedback of the sub-table index, thereby greatly saving the uplink resource.

Figure 7:
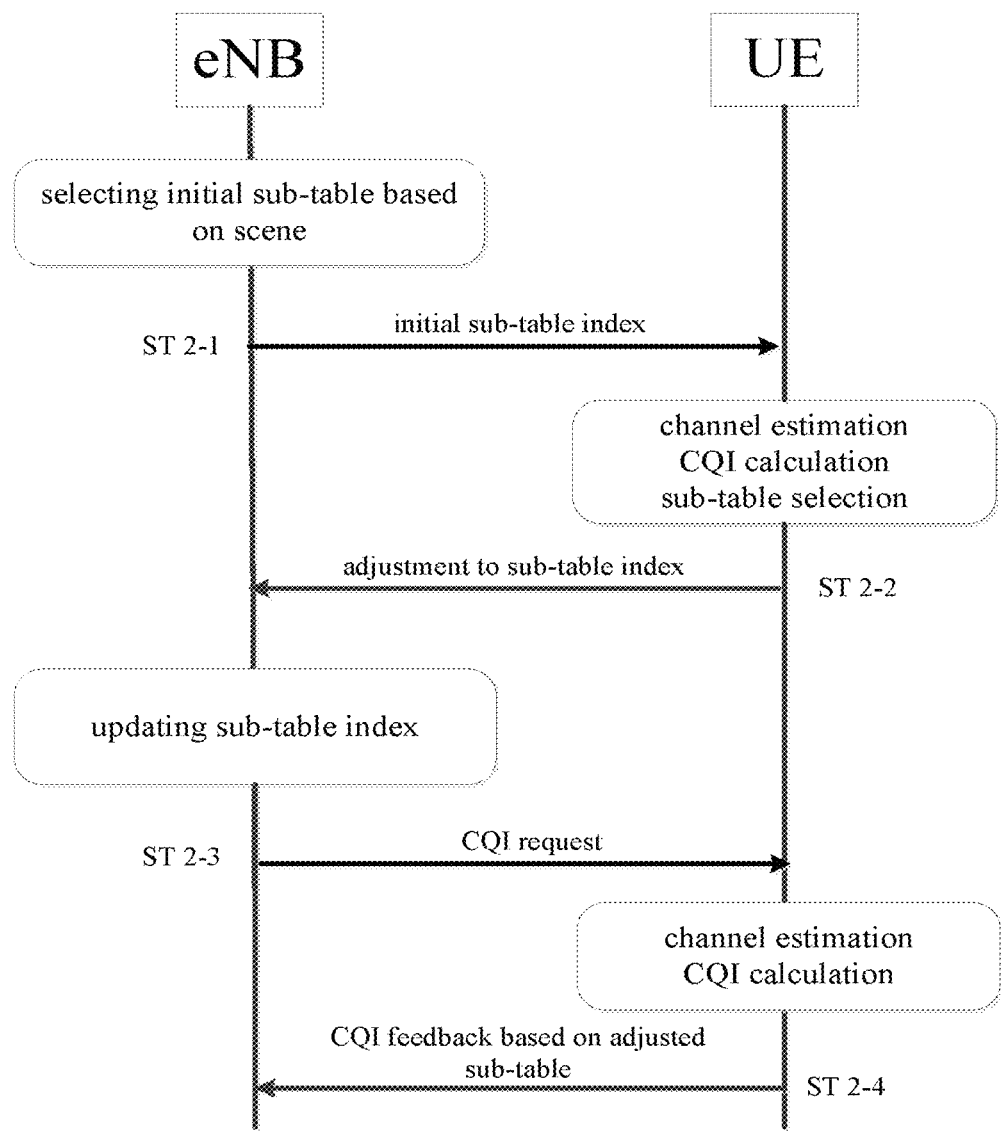
FIG. 7 is a schematic diagram illustrating an example process of a feedback operation performed between a user equipment and a base station according to another embodiment of the invention.

The exemplary process corresponding to the scheme 2 is shown in FIG. 7. Specifically, the initial sub-table is determined by the eNB, and the adjustment of the sub-table is determined by the UE.

Firstly, the eNB sends the initial sub-table index to respective UE based on a specific scene over, for example, a downlink broadcast channel (ST 2-1).

Next, the UE calculates the CQI index value based on a reference signal and the characteristics of the UE itself, selects a suitable sub-table, and reports to the eNB for example an offset value between this sub-table index and the sub-table index sent by the eNB (ST 2-2).

Then, the eNB updates the sub-table index based on the feedback from the UE and sends the CQI request to the UE (ST 2-3).

According to the received control signaling, the UE performs feedback of the intra-sub-table CQI index by using a feedback mode given by the control signaling (ST 2-4).

Some details and signaling designs of this scheme have been described in the description of the specific embodiments above, and will not be repeated here.

This scheme is advantageous in that, it is not limited by the scene, the range of application is wider than the scheme 1 mentioned before, and the initial sub-table index may be designed for different scenes and then the sub-table index is adjusted at UE.

Figure 8:
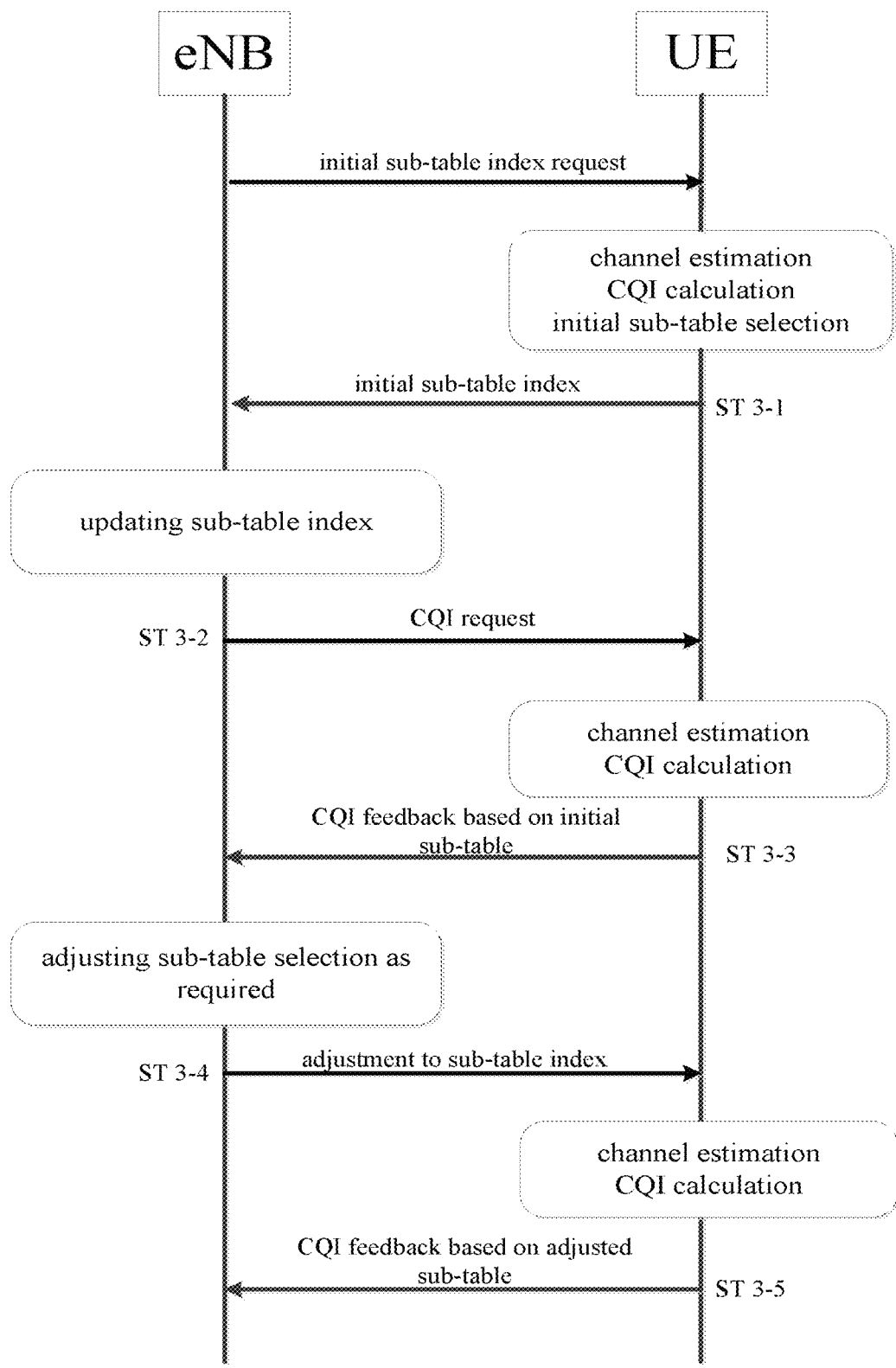
FIG. 8 is a schematic diagram illustrating an example process of a feedback operation performed between a user equipment and a base station according to yet another embodiment of the invention.

The exemplary process corresponding to the scheme 3 is shown in FIG. 8. Specifically, the initial sub-table is determined by UE, and the adjustment of the sub-table is determined by eNB.

In this scheme, DCI0 may be modified by following manners.

Manner 3-A: energy information is appended to the "flag for format 0/format 1A differentiation" bit of DCI0 format. If energy is detected at the receiving end, the "CQI request" bit in this case indicates that the sub-table index is modified by the eNB, with "0" indicating that the sub-table index is decreased by 1 and "1" indicating that the sub-table index is increased by 1. Moreover, energy information is appended to the "CQI request" bit of the DCI0 format. If the energy is detected at the receiving end, the "CQI request" bit in this case indicates a request for sub-table index; otherwise, the meaning of the "CQI request" bit is unchanged.

Upon reception of the sub-table index request sent by the eNB, the UE firstly calculates the CQI index value, selects a suitable sub-table, and reports this sub-table index to the eNB (ST 3-1). Regarding the method for selecting the sub-table, reference may be made to the description of the above embodiments. In this scheme, what is firstly fed back by the UE is the sub-table index instead of the intra-sub-table index, thus the signaling may be modified as follows.

Manner 3-B: a new UCI format is defined as format 4, which is based on the format2/2a/2b format, and is different from the format 2/2a/2b in that one bit of flag bit is added before the 20 bit CSI value. If the flag bit is "0", the transmission mode is unchanged, the reading of the base station is unchanged; if the flag bit is "1", the subsequent 4 bit CQI value for example is defined as the sub-table index value.

The eNB updates the sub-table index based on the feedback from the UE and sends the CQI request to the UE (ST 3-2).

Next, according to the received control signaling, the UE performs feedback of intra-sub-table CQI index by using a feedback mode given by the control signaling (ST 3-3).

The eNB analyzes the CQI information fed back by the UE, and in a case where the CQI information is at the boundary of the sub-table, the eNB adjusts the sub-table and notifies the UE of the result of the adjustment for example by using one bit of DCI0 information.

The UE updates the sub-table index based on the sub-table adjustment indication from the eNB, and performs feedback of the intra-sub-table index by using the updated sub-table index (ST 3-5).

This scheme is advantageous as compared with the schemes 1 and 2 in that, the initial sub-table is selected by the UE, thus the sub-table to be used by the UE can be responded directly without calibration on the initial sub-table by either the eNB or the UE. Of course, if the state of the channel changes at a later time, the UE may change the sub-table index as needed.

Figure 9:
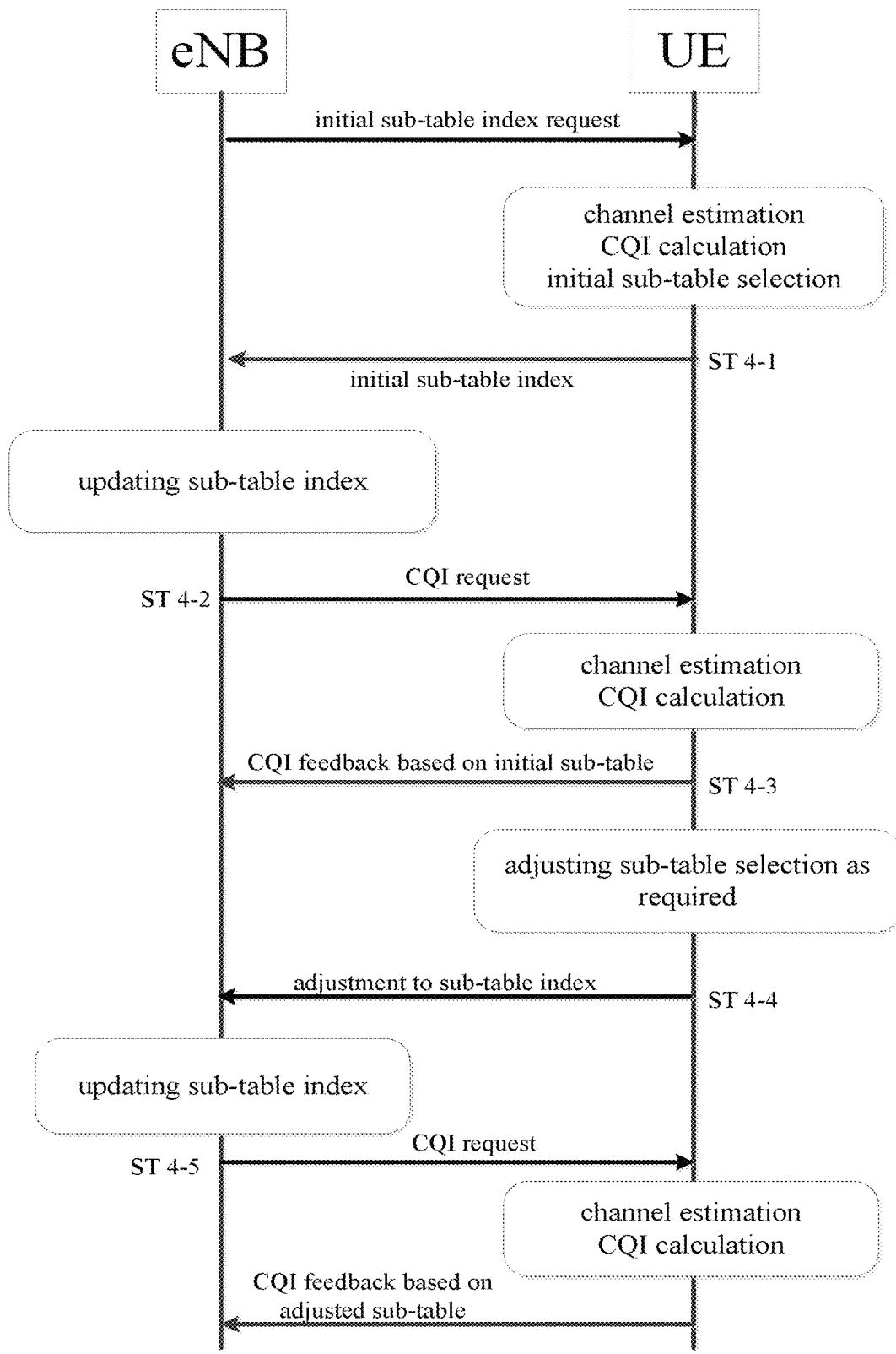
FIG. 9 is a schematic diagram illustrating an example process of a feedback operation performed between a user equipment and a base station according to a further embodiment of the invention.

The exemplary process corresponding to the scheme 4 is shown in FIG. 9, wherein the initial sub-table and the adjustment of the sub-table are both determined by the UE.

Specifically, the initial sub-table index is sent by the UE in both the schemes 4 and 3, thus, for the ST4-1 to ST4-3 in this scheme, reference may be made to the ST3-1 to ST3-3 in the scheme 3. Then, if the UE finds that the sub-table to be used currently is different from the sub-table that was used previously, for example, an offset value between the current sub-table index and the previous sub-table index may be fed back and reported to the eNB as follows.

Firstly, the DCI0 needs to be modified by using the method described above with reference to the method 3-A in the scheme 3.

Upon reception of the sub-table index request sent by the eNB, the UE firstly calculates the CQI index value, selects a suitable sub-table, and reports this sub-table index to the eNB (ST 4-1). Regarding the method for selecting the sub-table, reference may be made to the description of the above embodiments. Also, the signaling may be modified by using the method described above with reference to the method 3-B in the scheme 3.

The eNB updates the sub-table index based on the feedback from the UE and sends the CQI request to the UE (ST 4-2).

The UE performs feedback of the intra-sub-table CQI index by using a feedback mode given by a received control signaling (ST 4-3).

If the UE finds that the sub-table to be used currently is different from the sub-table that was used previously, for example, an offset value between the currently suitable sub-table index and the previous sub-table index is reported to the eNB. For specific signaling design, reference may be made to the above embodiments.

The eNB updates the sub-table index based on the feedback from the UE, and goes on with the feedback process of the intra-sub-table index (ST 4-5).

This scheme is advantageous as compared with the scheme 3 in that, the sub-table index difference is fed back by the UE end, so that the currently most suitable sub-table of the UE is notified to the eNB right away, and this scheme is more efficient with respect to the sub-table adjustment.

Obviously, some processes or methods are also disclosed in the above description of the communication device according to the embodiments. Hereinafter, an overview of these methods is given without repeating some details that have been discussed above.

Figure 5:
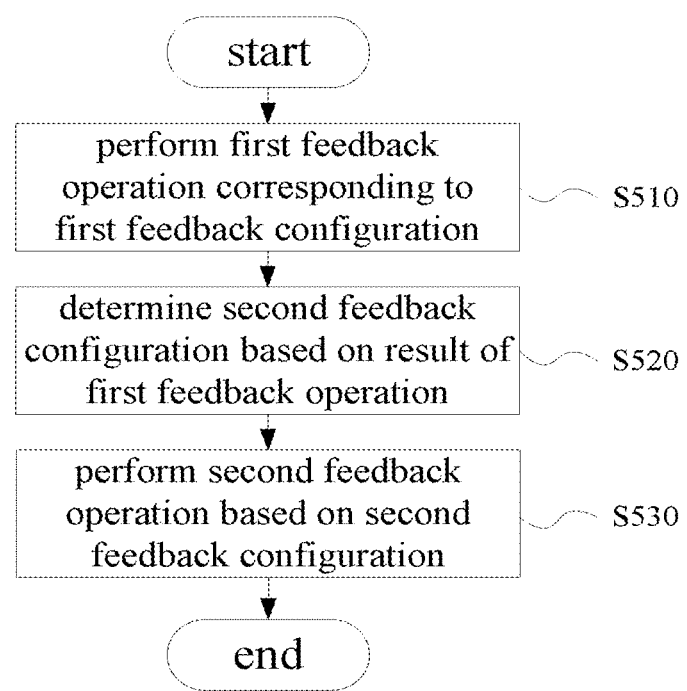
FIG. 5 is a flow chart illustrating a process example of a wireless communication method according to an embodiment of the invention.

The embodiments of the invention also include a wireless communication method, as shown in FIG. 5, the method includes:

S510, performing a first feedback operation corresponding to a first feedback configuration;

S520, determining a second feedback configuration based on a result of the first feedback operation; and S530, performing a second feedback operation based on the second feedback configuration.

Wherein, the first feedback configuration and the second feedback configuration each include a selection for a sub-table of a channel quality indication table.

As described in conjunction with detailed embodiments above, the steps of the above method may be performed on the base station side, or on the user equipment side, or on both the base station and the user equipment sides in a cooperation manner. The base station and the user equipment performing the wireless communication method according to the embodiment of the invention support and know in advance for example the CQI table and the configuration of the sub-tables as shown in FIG. 2 (for example, the predetermined number of the sub-tables, length of the sub-table, and overlapping degree between adjacent sub-tables), thus the base station and the user equipment may acquire the selection for the sub-table or the adjustment to the sub-table as long as the sub-table index or the sub-table index offset value is indicated, thereby performing the CQI feedback by using the selected sub-table.

Next, the wireless communication method according to the embodiment of the invention is described with regard to the scheme in which the initial sub-table index is determined by the base station and the adjustment to the sub-table is determined by the user equipment (corresponding to the scheme 2 described above). For the other schemes (such as the above schemes 1, 3 and 4), the steps of the method may be adjusted accordingly with reference to the exemplary process described above.

Firstly, the base station determines the initial sub-table (i.e., the first feedback configuration) based on different scenes, for example, according to the signal coverage of the base station, communication load of the base station, the statistical characteristic of mobility of user equipments served by the base station, and the designed capacity of the base station. For example, the base station sends the sub-table index to the user equipment over the broadcast channel (the first feedback operation), and sends the reference signal and the control signaling to the user equipment over the downlink control channel.

Next, the user equipment calculates the CQI index value based on the reference signal and the characteristics of the user equipment itself, selects the suitable sub-table (the second feedback configuration), and reports to the base station the offset value between this sub-table index and the sub-table index sent by the base station. Alternatively, the exact value of the sub-table index can be reported to the base station.

The base station updates the sub-table index based on the feedback from the user equipment, and sends the control signaling to the user equipment to request the user equipment to further feed back the specific CQI index value based on this sub-table.

Then, according to the received signaling, the user equipment performs feedback of the CQI index based on this sub-table by using a feedback mode given by the control signaling (the second feedback operation). It is to be noted that, the UE and the eNB may be adapted to the 4-bit sub-table which is the same in size as the CQI table in the conventional art, so the intra-sub-table feedback may be performed by using the feedback mode used by the original 4-bit CQI table.

Further, in accordance with the 3GPP TS 36.213 specification, the CQI feedback includes periodic report and non-periodic report. The periodic report is generally performed over the Physical Uplink Control Channel (PUCCH), including bandwidth CQI report and user selection sub-band CQI report. The non-periodic report is performed only over the Physical Uplink Shared Channel (PUSCH), including bandwidth CQI report, user selection sub-band CQI report and high-level configuration sub-band CQI report. The report mode specifically used by the UE may be controlled by the downlink RRC signaling of the eNB.

Figure 12:
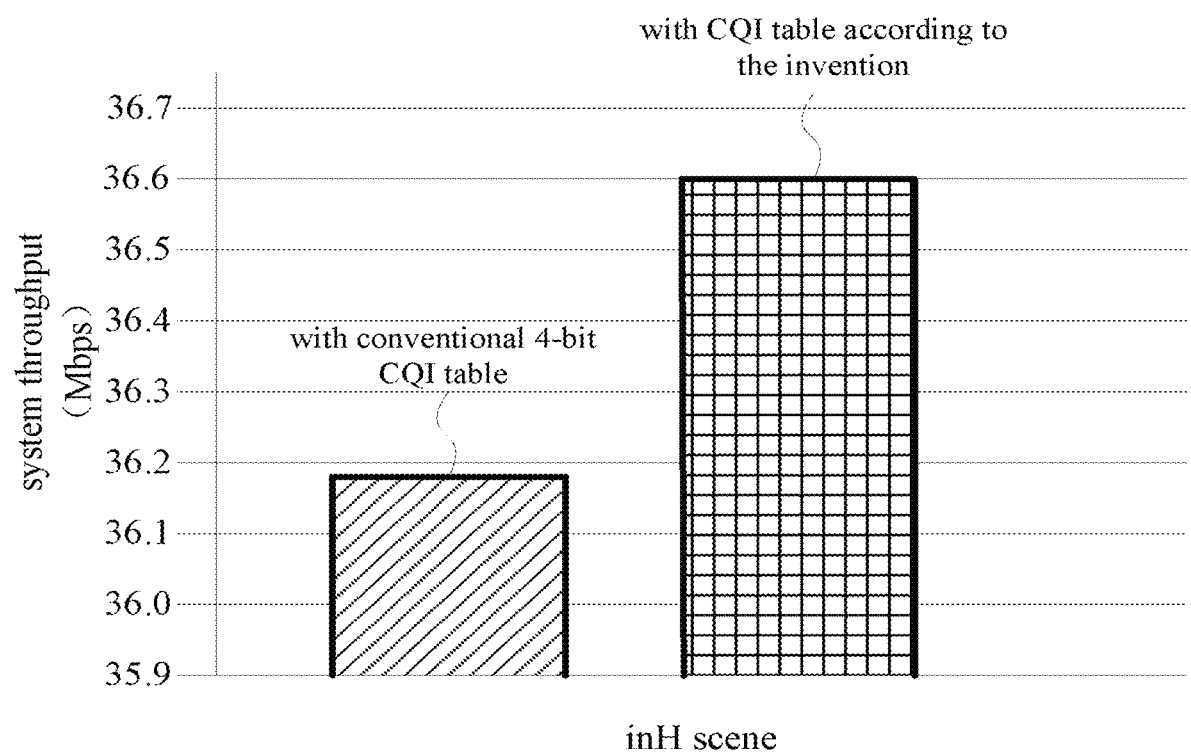
FIG. 12 shows simulation results of system throughput with a solution of the invention and with a conventional 4-bit CQI table in an in-house (InH) scene.

FIGS. 12 and 13 show simulation results of system throughput with a solution of the invention and with a conventional 4-bit CQI table in an in-house (InH) scene and in an Urban Macro cell (UMa) scene, respectively.

Specifically, by taking the CQI table shown in FIG. 14 as an example of the 4-bit CQI table in the conventional art, and taking the CQI table shown in FIG. 15 as an example of the whole CQI table used in the solution according to the invention, the feedback is performed by using the sub-table selected from the whole CQI table, thus the actual feedback accuracy is determined by the whole table.

Based on the system-level simulation in the 3GPP TR 36.814, the in-house (InH) scene and the Urban Macro cell (UMa) scene have a significant difference in Signal to Interference Noise Ratio (SINR) distribution. Thus, these two typical scenes are selected for simulation analysis. Further, to obtain the CQI distribution of an application scene, a link-level simulation is performed for a Block Error Ratio-Signal Noise Ratio (BLER-SNR) curve. In the link-level simulation, the Additive White Gaussian Noise channel is used, the system bandwidth is set to be 1.4 MHz, the SNR range is selected to be −15 dB to 28 dB, the simulation time is 2000 sub-frames, and no retransmission is considered.

According to the embodiments of the invention, in a case where entries for the 256QAM are added, no entry of the lower-order modulation scheme needs to be removed from the CQI table. Specifically, as compared to the table in FIG. 14, more entries are contained in the table in FIG. 15, that is, entries, 2, 4 and 6 are maintained.

The approximate throughout of the system is determined by the Shannon equation, as shown in FIGS. 12 and 13. It can be seen from the simulation result that, the embodiments of the invention improve the performance of the system as compared with the solution using the conventional CQI table.

In addition to the above embodiments, an embodiment of the invention further provides an electronic device applied to user equipment side or base station side. The electronic device includes one or more processors configured to perform a first feedback operation corresponding to a first feedback configuration and perform a second feedback operation based on a second feedback configuration. The first feedback configuration and the second feedback configuration each include a selection for a sub-table of a channel quality indication table. The second feedback configured is determined based on the result of the first feedback operation.

As an example, various steps of the above methods and various integral modules and/or units of the above devices may be implemented in software, firmware, hardware or a combination thereof. In a case of an implementation in software or firmware, programs consisting the software for implementing the above may be installed to a computer with a dedicated hardware structure (such as the general computer 1000 shown in FIG. 10) from a storage medium or network, which computer when installed with respective programs performs respective functions.

Figure 10:
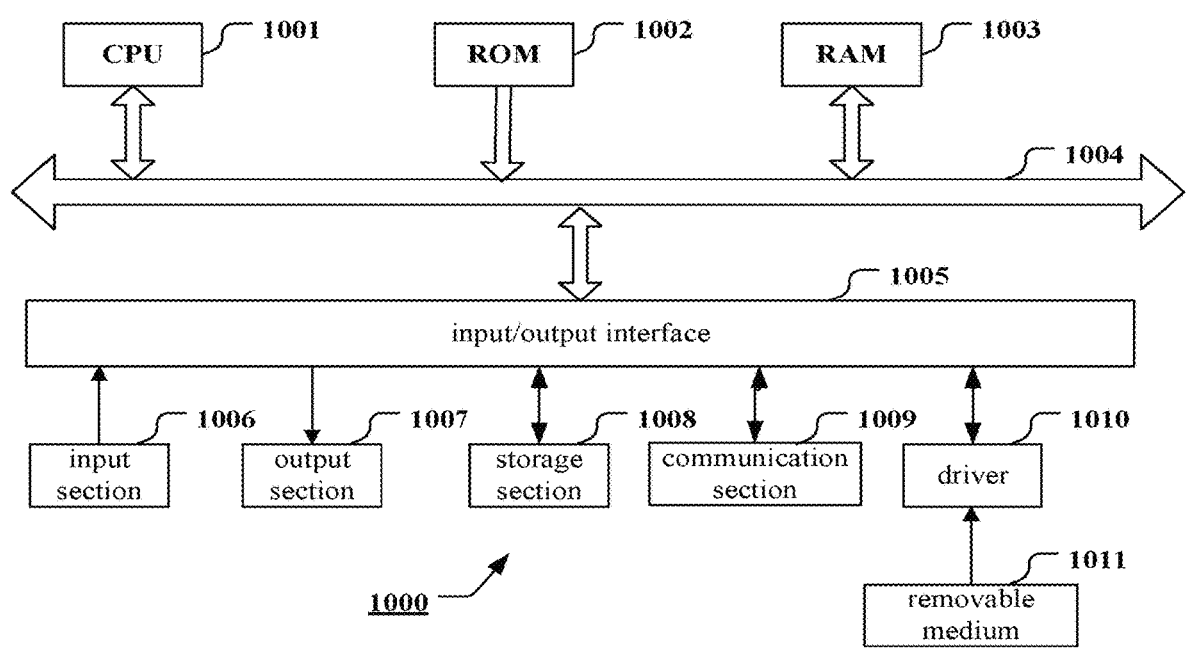
FIG. 10 is a block diagram illustrating an exemplary structure of a computer for implementing a method and a device of the disclosure.

In FIG. 10, an operation processing unit (i.e., CPU) 1001 performs various processes based on the program stored in a Read-Only Memory (ROM) 1002 or the program loaded into a Random Access Memory (RAM) 1003 from a storage section 1008. In the RAM 1003, data to be used in performing various processes by the CPU 1001 is also stored. The CPU 1001, the ROM 1002 and the RAM 1003 are linked to each other via a bus 1004. An input/output interface (I/F) 1005 is further linked to the bus 1004.

Following components are linked to the input/output interface 1005: an input section 1006 (including a keyboard, a mouse and the like), an output section 1007 (including a display, such as a Cathode Ray Tube (CRT) or a Liquid Crystal Display (LCD), a speaker and the like), the storage section 1008 (including a hard disk and the like), and a communication section 1009 (including a network interface card, such as a LAN card or a modem). The communication section 1009 performs the communication process via a network, such as the Internet. A driver 1010 may be further linked to the input/output interface 1005 as required. A removable medium 1011, such as a magnetic disk, an optical disk, a magnetic-optical disk or a semiconductor memory, may be mounted onto the driver 1010 as required, so that a computer program read out therefrom is installed to the storage section 1008.

In a case of implementing the above processes using software, the program consisting the software is installed from a network, such as the Internet, or a storage medium, such as the removable medium 1011.

It is to be understood by those skilled in the art that, the storage medium is not limited to the removable medium 1011 shown in FIG. 10 in which the program is stored and which is distributed separately from the device for providing the user with the program. Examples of the removable medium 1011 include a magnetic disk (including a floppy disk (registered trademark)), an optical disk (including a Compact Disc Read-Only Memory (CD-ROM) and a Digital Versatile Disc (DVD)), a magnetic-optical disk (including Mini Disk (MID) (registered trademark)) and a semiconductor memory. Alternatively, the storage medium may be the hard disk contained in the ROM 1002 or the storage section 1008 and the like, in which the program is stored and which is distributed to the user together with the device including the same.

An embodiment of the invention further relates to a program product storing machine readable instruction code. The instruction code, when read out and executed by a machine, performs the method according to the embodiment of the invention.

Accordingly, a storage medium for carrying the program product storing the machine readable instruction code is also included in the disclosure of the invention. The storage medium includes but is not limited to a floppy disk, an optical disc, a magnetic-optical disk, a storage card, a storage stick and the like.

Embodiments of the invention also involve the following electronic device. When being applied to base station side, the electronic device may be implemented as any type of evolved Node B (eNB), such as a macro eNB and a small eNB. A small eNB is an eNB which can cover a cell smaller than a macro cell, such as a pico-eNB, a micro eNB and a family (femto) eNB. Alternatively, the electronic device may be implemented as any other type of base station, such as NodeB and a Base station Transceiver (BTS). The electronic device may include a main body (which is also referred to as a base station device) configured to control the wireless communication and one or more Remote Radio Heads (RRH) provided at a place other than the main body. Hereinafter, various types of terminals to be described below may operate as a base station by performing a function of the base station temperately or semi-permanently.

In a case of being applied to user equipment side, the electronic device may be implemented as a movable terminal (such as an smart phone, a tablet Personal Computer (PC), a notebook PC, a portable game console, a portable/dongle mobile router and a digital camera device) or an on-board terminal (such as a car navigation device). Alternatively, the electronic device may be a wireless communication module mounted on each one of the above terminals (such as an integrated circuit module including a single or multiple chips).

[Application Examples of Terminal Devices]

Figure 11:
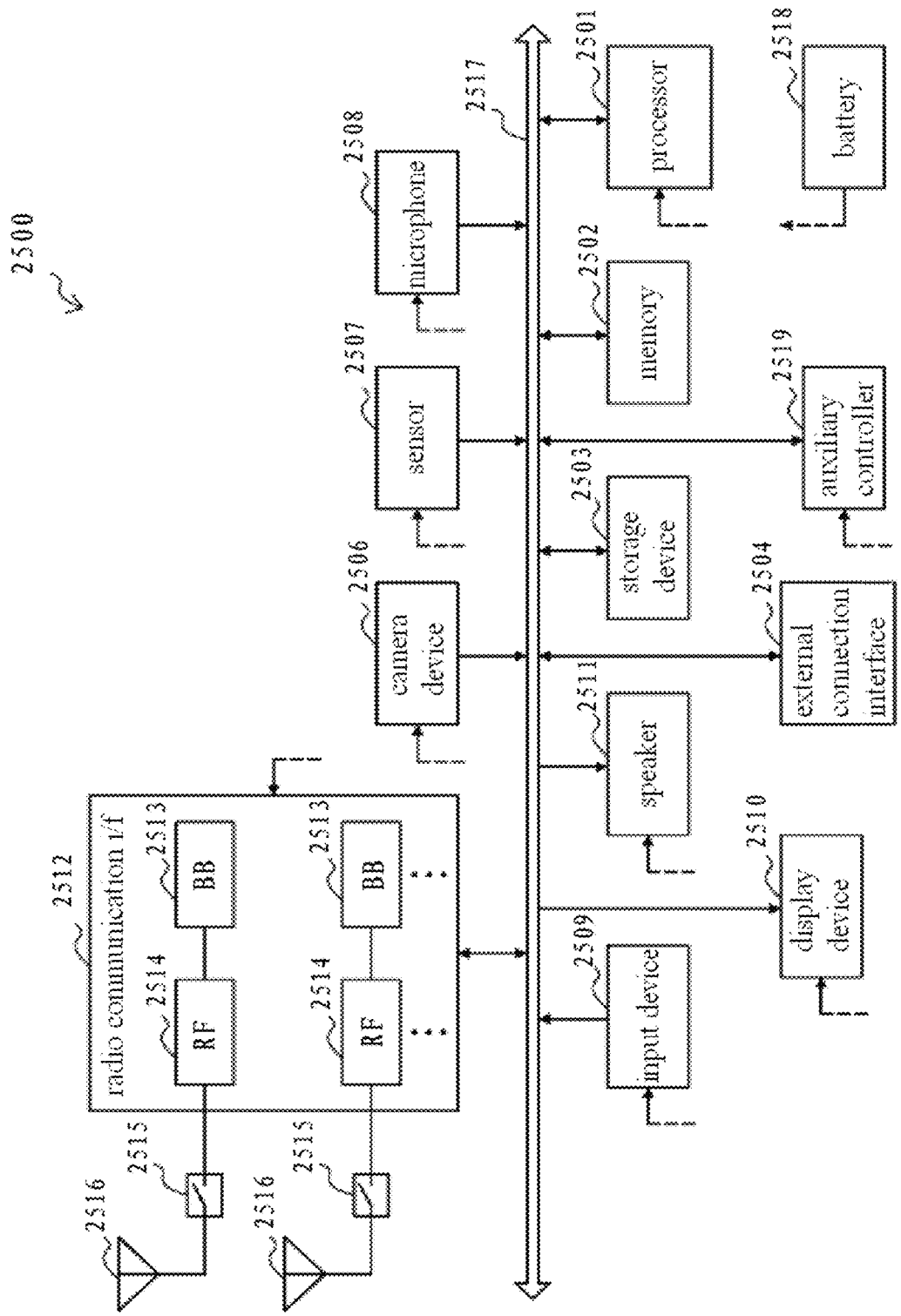
FIG. 11 is a block diagram illustrating an example of an schematic configuration of a smart phone to which a technique of the disclosure can be applied.

FIG. 11 is a block diagram illustrating an example of a schematic configuration of a smart phone 2500 in which a technique of the disclosure can be applied. The smart phone 2500 includes a processor 2501, a memory 2502, a storage device 2503, an external connection interface 2504, a camera device 2506, a sensor 2507, a microphone 2508, an input device 2509, a display device 2510, a speaker 2411, a radio communication interface 2512, one or more antenna switch 2515, one or more antenna 2516, a bus 2517, a battery 2518 and an auxiliary controller 2519.

The processor 2501 may be for example a CPU or a System on Chip (SoC), and control functions of an application layer and other layers of the smart phone 2500. The memory 2502 includes a RAM and a ROM, and stores data and a program to be executed by the processor 2501. The storage device 2503 may include a storage medium, such as a semiconductor memory and a hard disk. The external connection interface 2504 is an interface configured to connect an external device (such as a storage card and a Universal Serial Bus (USB) device) to the smart phone 2500.

The camera device 2506 includes an image sensor (such as a Charge Coupling Device (CCD) and a Complementary Metal-Oxide Semiconductor (CMOS)), and generates a captured image. The sensor 2507 may include a group of sensors, such as a measuring sensor, a gyro sensor, a geomagnetic sensor and an acceleration sensor. The microphone 2508 converts the sound input into the smart phone 2500 into an audio signal. The input device 2509 includes for example a keypad, a key board, a button, a switch or a touch sensor configured to detect the touch on a screen of the display device 2510, and receives the operation or information input by a user. The display device 2510 includes a screen (such as a Liquid Crystal Display (LCD) and an Organic Light Emitting Diode (OLED) display), and display an output image from the smart phone 2500. The speaker 2511 converts the audio signal output from the smart phone 2500 into a sound.

The radio communication interface 2512 supports any cellular communication solution (such as LTE and LTE-Advanced), and performs the wireless communication. The radio communication interface 2512 generally includes for example a BB processor 2513 and a RF circuit 2514. The BB processor 2513 may perform for example coding/decoding, modulation/demodulation and multiplexing/de-multiplexing, and perform various types of signal processes for wireless communication. The RF circuit 2514 may include for example a mixer, a filter and an amplifier, and transmit and receive a wireless signal via the antenna 2516. The radio communication interface 2512 may be a chip module on which the BB processor 2513 and the RF circuit 2514 are integrated. As shown in FIG. 11, the radio communication interface 2512 may include multiple BB processors 2513 and multiple RF circuits 2514. Although FIG. 11 shows an example in which the radio communication interface 2512 includes multiple BB processors 2513 and multiple RF circuits 2514, the radio communication interface 2512 may include a single BB processor 2513 or a single RF circuit 2514.

In addition to cellular communication solution, the radio communication interface 2512 may support other types of wireless communication solutions, such as a short distance wireless communication solution, a near field communication solution and a wireless Local Area Network (LAN) solution. In this case, the radio communication interface 2512 may include the BB processor 2513 or the RF circuit 2514 for each wireless communication solution.

Each of the antenna switches 2515 switches a connection destination of the antenna 2516 between multiple circuits (such as the circuits for different wireless communication solutions) included in the radio communication interface 2512.

Each of the antenna switches 2515 includes a single or multiple antenna elements (such as the multiple antenna elements included in a MIMO antenna), and is configured to transmit and receive the wireless signal by the radio communication interface 2512. As shown in FIG. 11, the smart phone 2500 may include multiple antennas 2516. Although FIG. 12 shows an example in which the smart phone 2500 includes multiple antennas 2516, the smart phone 2500 may include a single antenna 2516.

The smart phone 2500 may include the antenna 2516 for each wireless communication solution. In this case, the antenna switch 2515 may be omitted from the configuration of the smart phone 2500.

The bus 2517 connects the processor 2501, the memory 2502, the storage device 2503, the external connection interface 2504, the camera device 2506, the sensor 2507, the microphone 2508, the input device 2509, the display device 2510, the speaker 2511, the radio communication interface 2512 and the auxiliary controller 2519 with each other. The battery 2518 supplies power to respective blocks of the smart phone 2500 shown in FIG. 12 via a feeding wire which is denoted as a dashed line in the drawing. The auxiliary controller 2519 controls a minimum necessary function of the smart phone 2500 in a sleep mode, for example.

In the smart phone 2500 shown in FIG. 11, at least some of the functions of the signal transceiver device 110, the receiving device 610 and the feedback device 620 described in FIGS. 1 and 6 may be implemented via the radio communication interface 2512. At least some of the functions of the control device 120 and the feedback device 620 described with reference to FIGS. 1 and 6 may be implemented by the processor 2501 and the auxiliary controller 2519. Further, by executing the program stored in the memory 2502, the processor 2501 may perform the method described with reference to FIG. 5 or 7.

In the above description of the specific embodiments of the invention, features described and/or illustrated for an embodiment can be used in one or more other embodiments in a same or similar way, can be combined with features in other embodiments, or can be used to replace features in other embodiments.

It is to be emphasized that, item "comprise/include" when used herein refers to presence of a feature, an element, a step or a component, but not excludes presence or addition of one or more other features, elements, steps or components.

In the above embodiments and example, various steps and/or units are denoted by numerical reference consisted of numbers. It is to be understood by those ordinary skilled in the art that these numerical references are only used for convenience of description and drawing, but not for indicating its order or any other definition.

Further, the method of the invention is not limited to be performed in the time sequence described in the specification, and may be performed in other time sequences, in parallel or separately. Thus, the order for the method described in the specification is not intended to limit the technical scope of the invention.

Although the invention has been described through description of the specific embodiments of the invention, it is to be understood that, all the above embodiments and examples are exemplary but not restrictive. Various modifications, improvements and equivalents may be made to the invention by those skilled in the art without deviating from the spirit and scope of the appended claims, which modifications, improvements and equivalents should also be deemed as falling within the scope of protection of the invention.

The invention claimed is:

1. A wireless communication device operating as a user equipment, comprising:
   circuitry configured to perform a first feedback operation corresponding to a first feedback configuration and to perform a second feedback operation based on a second feedback configuration, wherein the first feedback operation includes receiving information indicating the first feedback configuration from a base station or feeding back channel quality to the base station based on the first feedback configuration and wherein the second feedback operation includes feeding back channel quality to the base station based on the second feedback configuration,
   wherein the first feedback configuration and the second feedback configuration each include a selection for a sub-table of a channel quality indication table, and the second feedback configuration is determined based on a result of the first feedback operation, and
   wherein the first feedback configuration is an initial sub-table and the initial sub-table is selected based on signal quality of a request signal received from the base station, and
   wherein the second feedback configuration is indicated by a sub-table index value of the channel quality indication table calculated by the user equipment based on a received reference signal and characteristics of the user equipment and reported to the base station by an offset value between the calculated sub-table index and a sub-table index received from the base station.

2. The wireless communication device according to claim 1, wherein the circuitry is further configured to determine the first feedback configuration.

3. The wireless communication device according to claim 2, wherein the circuitry is further configured to determine the first feedback configuration based on signal quality of a request signal received from the base station.

4. The wireless communication device according to claim 1, wherein the channel quality indication table includes a plurality of sub-tables, and
   at least one of the following is predetermined:
      a number of the plurality of the sub-tables;
      a length of at least one of the plurality of the sub-tables; and
      an overlapping degree between adjacent sub-tables in the plurality of the sub-tables.

5. A wireless communication method, comprising:
   performing, by circuitry of a wireless communication device operating as a user equipment; a first feedback operation corresponding to a first feedback configuration;
   determining, by the circuitry of the wireless communication device, a second feedback configuration based on a result of the first feedback operation; and
   performing, by the circuitry of the wireless communication device; a second feedback operation based on the second feedback configuration,
   wherein the first feedback configuration is an initial sub-table of a channel quality indication table and the initial sub-table is selected based on signal quality of a request signal received from a base station, and
   wherein the second feedback configuration is indicated by a sub-table index value of the channel quality indication table calculated by the wireless communication device based on a received reference signal and characteristics of the wireless communication device and reported to the base station by an offset value between the calculated sub-table index and a sub-table index received from the base station.

* * * * *